United States Patent [19]
Cameron

[11] Patent Number: 5,232,670
[45] Date of Patent: Aug. 3, 1993

[54] CATALYTIC CONVERTER

[76] Inventor: Gordon M. Cameron, 4 Wellesbourne Crescent, Willowdale, Ontario, Canada, M2H 1Y7

[21] Appl. No.: 824,947

[22] Filed: Jan. 24, 1992

[51] Int. Cl.$^5$ .............................................. B01D 50/00
[52] U.S. Cl. ............................ 422/171; 422/176; 422/177; 422/191; 422/193; 422/195; 422/239; 422/311; 423/532; 423/533
[58] Field of Search ............... 422/171, 177, 176, 180, 422/191, 193, 195, 239, 311; 423/532, 533

[56] References Cited

U.S. PATENT DOCUMENTS

| | | | |
|---|---|---|---|
| 2,230,467 | 2/1941 | Nelly, Jr. et al. | 422/171 |
| 3,443,910 | 5/1969 | Newman et al. | 422/171 |
| 3,498,752 | 3/1970 | Kuo | 422/191 |
| 3,523,762 | 8/1970 | Broughton | 422/191 |
| 3,746,515 | 7/1973 | Friedman | 422/191 |
| 4,335,076 | 6/1982 | McFarland | 422/171 |

*Primary Examiner*—Lynn M. Kryza
*Attorney, Agent, or Firm*—Cushman, Darby & Cushman

[57] ABSTRACT

An improved catalytic converter having a shell, a plurality of horizontal catalyst bed supports upon which catalyst is retained and arranged one bed support above another within the shell, and a plurality of horizontal divider plates, one located between each pair of bed supports; the improvement comprising wherein at least one of the bed supports comprises a first full bed support extending essentially across the diameter of the shell, the full bed support comprising (i) an inner dished plate, centrally and symmetrically disposed within the shell, and (ii) an annular dished plate between the shell and the inner dished plate; a substantially circular gas entry port and a substantially circular gas exit port within the shell in gaseous communication with the first full bed support; and a substantially dished divider plate extending essentially across the diameter of the shell above the first bed support and comprising (i) an inner divider plate, centrally and symmetrically disposed within the shell and (ii) an annular curved divider plate between the shell and the inner divider plate having a raised first arcuate-shaped portion adjacent the shell substantially the circumference of the shell. The converter has gas entry and exit ports which conveniently and advantageously allow gases directly to and from the catalyst beds.

4 Claims, 4 Drawing Sheets

CATALYTIC CONVERTER

FIELD OF THE INVENTION

This invention relates to catalytic converters of the kind used to convert gaseous reactants to gaseous products, and more particularly to the conversion of sulphur dioxide gas to sulphur trioxide gas in the manufacture of sulphuric acid.

BACKGROUND OF THE INVENTION

Converters presently used to convert sulphur dioxide gas to sulphur trioxide gas are typically large cylindrical vessels comprising a shell containing a number of catalyst beds disposed one above the other. The processed gases pass through the catalyst beds in several, optionally desired sequences and are cooled between beds both to recover the heat generated in each bed and to assist in the kinetics and equilibrium of the reaction. Each bed is separated from other beds by division plates or membranes.

Classically, in sulfuric acid manufacturing plants, converters were fabricated from carbon steel, cast iron, and brick, when these materials were the only ones available. Carbon steel was used for the shell and cast iron posts, beams, and plates or sections were assembled inside the converter to support the many beds of catalyst.

In an alternative design, brick structures were erected for the same purpose, with steel being used for the external shell. At the time such converters were designed, manufacturing plants were small in capacity and gas strengths were low, which resulted in modest gas temperatures. In addition, platinum catalyst was used which tended to required operations at temperatures below those at which present-day catalysts operate. Vanadium catalyst, much larger plant capacities with higher internal pressures and much higher gas strengths have drastically increased the mechanical loads on such converter shells, while at the same time the conventional carbon steel becomes hotter and, hence, much weaker. Distortion of the vessel and, thus, leakage are, therefore, more common. However, such converters are well-known in the industry and a discussion of their features can be found in many references to sulfuric acid manufacture.

Sulfuric acid plant converters are essentially atmospheric pressure reactors which handle large volumes of gas, passing it vertically downward through shallow horizontal beds of catalyst with the gas removed between beds for cooling and then returned for the next conversion step. Typically, four beds have been used in most plants although some five bed converters exist. Converter diameters in modern plants may typically be 40 feet in diameter and 60 feet high while the beds contained in the converter will range from 2 to 4 feet thick. The remaining space is occupied by the plenums above and below the catalyst beds. The gas flows in a large plant will often require gas ducting in the 7 to 8 feet range. If this ducting is connected directly to the converter shell particularly above and below each catalyst bed, the converter height would have to be of the order of about 80 feet, which is not acceptable as being inconvenient as all the other plant equipment treating the gases are not more than 40 feet above grade.

The classic solution to this problem has been to make an elliptical or shallow rectangular opening in the converter above the catalyst bed and obtain the appropriate inlet area by using a broad opening. For example, a 4 feet duct could be replaced by a 2.5 by 6 feet rectangular opening. These transitions are a standard feature of the classic sulfuric acid plant and are referred to as "mouth organs". Aside from its cost, a mouth organ is complex, costly to maintain, and the transition to round ducts forces the other equipment around the converter to be located away from the converter shell. This further inflates the cost of the converter system and the plant. Where the plants are small, a simple round connection is feasible However, in the larger plants the mouth organ design is necessary but expensive.

The classic catalytic converter for sulphur dioxide conversion is also made of materials which have significant design restrictions on their use. Carbon steel which is used in the shells and transitions is very weak at the maximum temperatures obtained in modern reactors and deforms in an inelastic manner, using up the freedom for expansion in expansion joints and ducts and leads to cracking and leaks. It is also not strong enough for the internal catalyst bed supports. The catalyst is therefore held on high quality cast-iron grids which in turn are supported on cast iron posts. These posts are supported from foundation means under the floor and the structure is assembled starting from the bottom. The cast iron sections making up the bed are sealed using an appropriate asbestos rope or the like. Division between beds relies normally on steel plates supported by a network of posts with the division plates welded to minimize gas leakage.

In these designs, there is little possibility of re-arranging the cast iron sections or the divider plates to facilitate gas entry. The design is, thus, restricted in medium and larger size plants to the use of mouth organ transitions.

A newer approach to converter design is offered by McFarland in U.S. Pat. No. 4,335,076. McFarland switches from the classic materials for sulfuric acid plant converters to stainless steel throughout the converter and while using horizontal catalyst beds, supports them on flexible diaphragms which in turn are supported at the shell and an axial core tube by strength welding. The beds communicate with the gas supplies either from a peripheral gas distribution system, which relies on a nozzle located below the catalyst bed, or from the core of the converter with a radial gas outward flow into the space above the catalyst bed. This design concept therefore does not offer any help to the problem of entry to the catalyst bed through the side and, in fact, teaches that it should be avoided. It does, however, demonstrate an arrangement of the exit nozzle in which a round nozzle is located on the vessel wall below the catalyst bed.

When a multi-bed converter is required, there are not only the bed supports but also the dividers between the catalyst beds. For a 4 bed system there are therefore 7 membranes where all are horizontal and frequently supported. In the newer technology of McFarland the grids were replaced by stainless steel membranes which were much less rigidly supported but horizontal membranes were the basic standard.

SUMMARY OF THE INVENTION

It is a primary objective of the present invention to provide a converter by which gas in a large sulfuric acid plant is introduced simply to the space above the catalyst bed.

It is a further object of the invention to provide a converter which allows round nozzles to be used to bring the gas into the converter bed and away from the catalyst bed.

Other and further objects and advantages of this invention will become apparent upon reading the following specification taken in conjunction with the accompanying drawings.

Accordingly, in its broadest aspect the invention provides a converter having a shell, a plurality of horizontal catalyst bed supports upon which catalyst is retained and arranged one bed support above another within said shell, and a plurality of horizontal divider plates, one located between each pair of bed supports; the improvement comprising at least one of said bed supports comprises a first full bed support extending essentially across the diameter of said shell, said full bed support comprising (i) an inner dished plate, centrally and symmetrically disposed within said shell, and (ii) an annular dished plate between said shell and said inner dished plate; a substantially circular gas entry port and a substantially circular gas exit port within said shell in gaseous communication with said first full bed support; and a substantially dished divider plate extending essentially across the diameter of said shell above said first bed support and comprising (i) an inner divider plate, centrally and symmetrically disposed within said shell and (ii) an annular curved divider plate between said shell and said inner divider plate having a raised first arcuate-shaped portion adjacent said shell substantially the circumference of said shell.

In a preferred aspect the invention provides a converter as hereinabove defined further comprising a second substantially circular gas exit port within said shell and not in gaseous communication with said first full bed support; and wherein said annular curved divider plate has a lowered second arcuate-shaped portion adjacent the circumference of said shell and said second gas exit port.

Yet, a more preferred, the converter has an arcuate-shaped gas-deflector plate adjacent a lower portion of said gas entry port.

In a yet more preferred aspect, the invention provides a converter having a plurality of said first full beds each of which is in gaseous communication with its own gas entry port and gas exit port and divider plates as hereinabove defined located above and between said bed supports.

BRIEF DESCRIPTION OF THE DRAWINGS

In order that the invention may be better understood a preferred embodiment will now be described by way of example only with references to accompanying drawings wherein.

DESCRIPTION OF A PREFERRED EMBODIMENT

Figure 1:
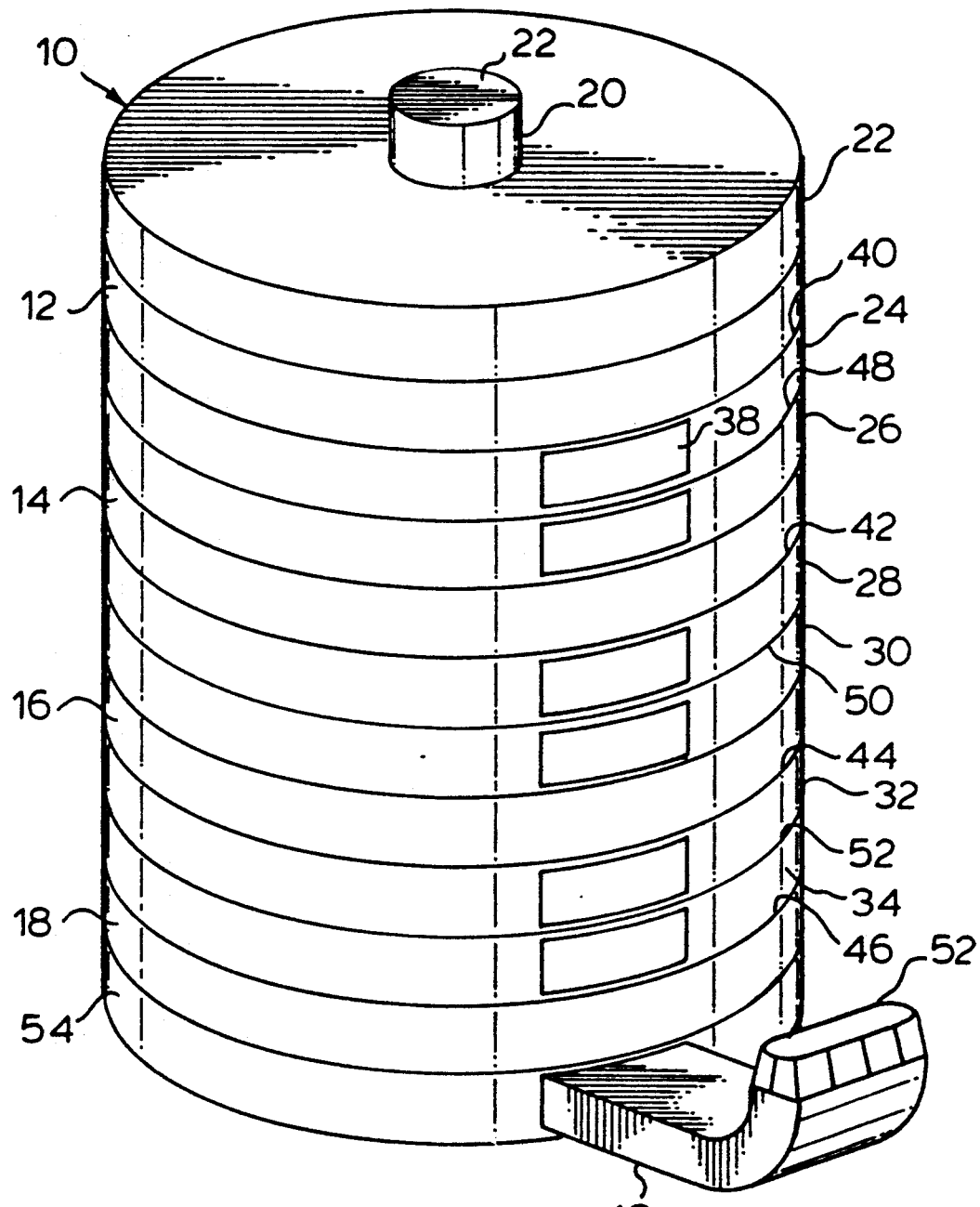
FIG. 1 is a diagramatic perspective view of a classic prior art converter.

With reference, firstly, to FIG. 1, the prior classic converter design shown has nozzles entering and leaving the catalyst beds with a single transition member connected to a round duct.

The converter vessel shown generally as 10, contains four catalyst beds 12, 14, 16 and 18 supported on cast iron floor supports 40, 42, 44, and 46, respectively, and separated by divider plates 48, 50, and 52, as shown. An inlet duct 20 to top bed 12 connects to the plenum 22 above the bed. Gas from bed 12 leaves from space 24 through a shallow rectangular opening 38. Gas enters the three remaining beds through rectangular gas entry ports 40, 42, and 44 respectively, to plenums 26, 30 and 34, respectively, and leave from plenums 28, 32 and 52 through rectangular openings 46, 48 and 50. For a medium capacity plant the rectangular openings were typically 3 by 12 feet in size and the transitions to circular ducting 52, 6.5 feet in diameter.

Figure 2:
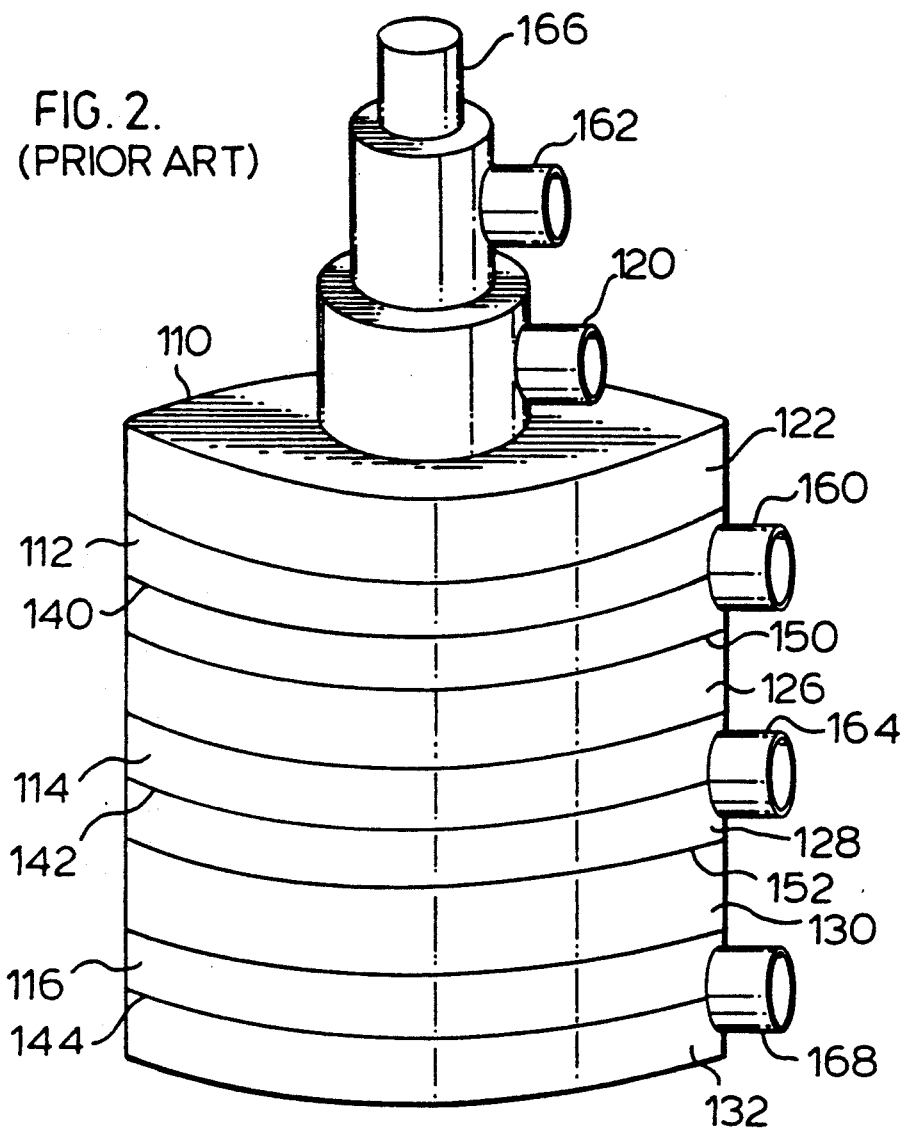
FIG. 2 is a diagramatic perspective view in part of an alternative prior art converter according to U.S. Pat. No. 4,335,076.

With reference now to FIG. 2, wherein a three bed converter 110 according to U.S. Pat. No. 4,335,076, has beds 112, 114 and 116 fed from concentric tubes within an inner core and supported on annular bed membrane supports 140, 142, and 144, respectively. Divider plate membranes 150 and 152 are also annular.

Gas for uppermost bed 112 enters through nozzle 120, flows through an outer annular passage to space 122 and then downward through top bed 112. The partially converted gas then leaves converter 110 through nozzle 160 which extends from the top of bed 112 to almost the next bed 114 using an internal transition. For conversion in second bed 114, gas enters through nozzle 162 and flows through an inner annulus to space 126 and then through bed 114. From bed 114 converted gas flows through space 128 to nozzle 164. Gas to the bottom bed enters through nozzle 166, flows through the core tube to space 130 above bed 116 and then through bed 116. Gas from bed 116 in space 132 then flows through nozzle 168 from the converter and here a shell expansion is provided to give sufficient vertical space for the round duct.

Figure 3:
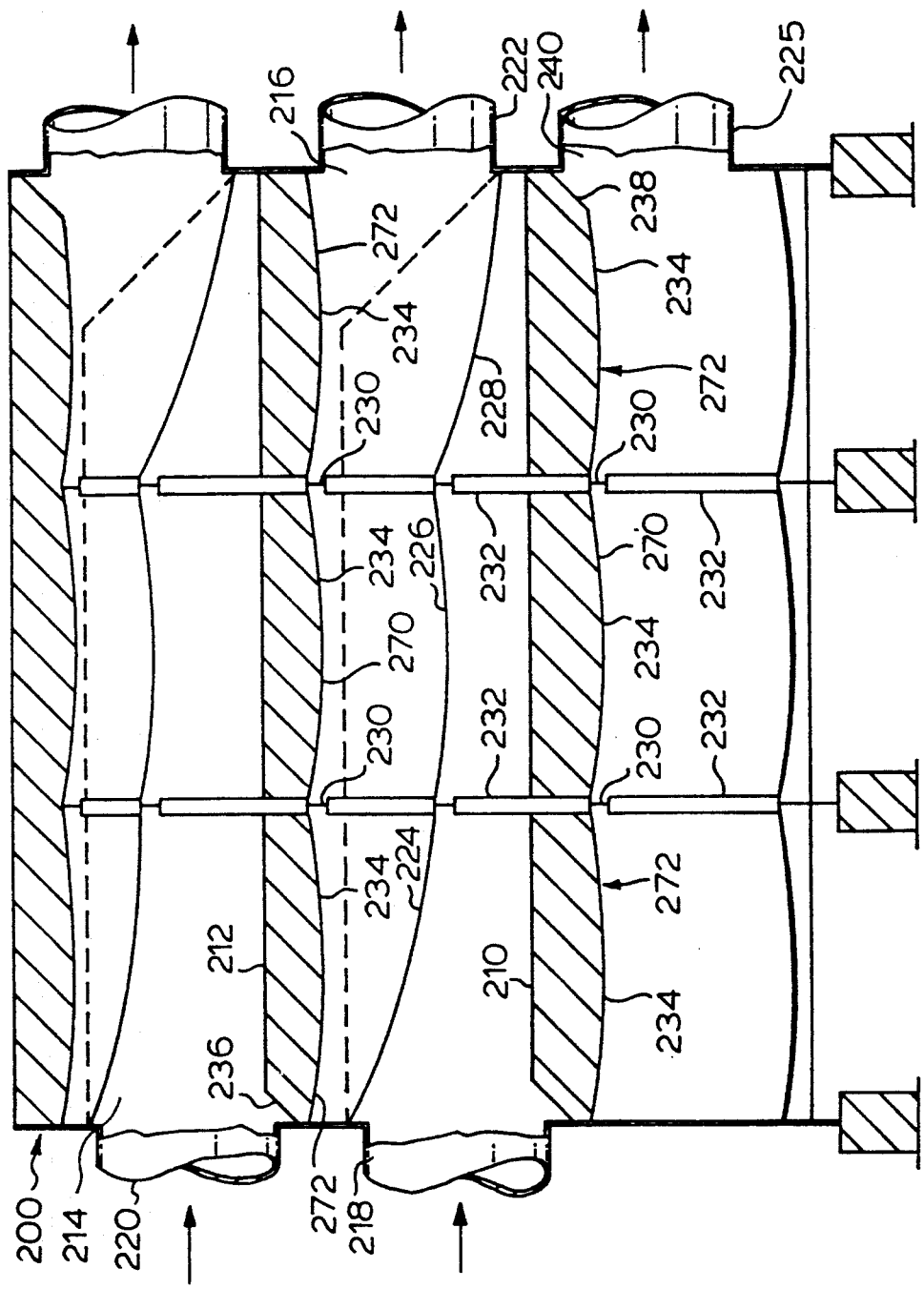
FIG. 3 is a part sectional view of a plurality of catalyst beds of a converter according to the invention.

With reference now to FIG. 3 wherein a part of a stainless steel converter shell, shown generally as 200, contains two full diameter catalyst beds 212 and 210 with spaces 214 and 218, respectively, above the two beds and spaces 216 and 240, respectively, below the two beds. Each bed 210, 212 is supported on horizontal, dished, perforated, stainless steel full bed support membranes, shown generally as 234, supported at shell 200 and at support rings 230.

Each full bed support 234 comprises an inner dished plate 270, centrally and symmetrically disposed within shell 200 around the axis thereof. In the embodiment shown, plates 270 are convex to the respective catalyst space directly below it. Full bed support 234 additionally comprises an annular dished plate 272, between shell 200 and inner plate 270. Plate 272 is also substantially convex to the space below it, except adjacent its gas exit port 224 wherein it has the generally raised arcuate-shaped portion, 238.

A divider plate or membrane which extends essentially across the diameter of shell 200 between the two beds is shown as three sections 224, 226, and 228. Section 228 is that section nearest circular outlet gas nozzle 222 associated with upper bed 212 and is connected to shell 200 at a small distance above lower bed 210 and to support rings 230 which are supported on posts 232. Section 228 is low where nozzle 222 is located, but on either side of nozzle 222 membrane 228 rises to approach the bottom of the bed above so that maximum clearance over bed 210 is obtained for maintenance. Thus, the terminal portion of section 228 substantially follows the circumference of circular gas port 222 at the intermediate and lower parts. Section 226 of the divider plate is, preferably, also curved as an inner dished divider plate centrally and symmetrically disposed within shell 200 and seals off the central passage between support posts 232.

Annular curved divider plate 224 disposed between shell 200 and inner dished divider plate 226 represents a sealing membrane of the divider as it is fixed to converter shell 200 a short distance below bed 210, such that there is adequate gas flow area below and around bed 210 to allow gas to flow to nozzle 222, but sufficient space is left above the bed, both to allow incoming gas to distribute better and also to provide more space for catalyst screening. Thus, plate 224 has a raised first arcuate portion adjacent substantially circumference of shell 200 and a lowered second arcuate shaped portion adjacent the circumference of shell 200 at its portion adjacent gas exit port 222 of the bed above.

Thus, the full divider plate located above bed 210 and below bed 212 comprises inner dished divider plate 226, which is symmetrically and axially disposed within shell 200, and in the embodiment shown, is concave to the gaseous space below it; and annular dished divider plate 224 between shell 200 and plates 226, which is also substantially concave to the gaseous space above it, except at region 228.

The diameters of circular gas entry port nozzle 220 and circular gas exit nozzle 222 in large plants will thus exceed the maximum height between its adjacent beds and its divider plate and in this case, both nozzles are shown as overlapping the adjacent beds. Nozzle 220 extends below bed 212 and an arcuate-shaped gas deflector plate 236, optionally, conical or cylindrical in shape is fixed to shell 200 in such a way as to divert incoming gas above bed 212. Alternatively, a gas distributor (not shown) could be used adjacent port 220.

Nozzle 225, projects above the bottom of bed 210 and sloped section 238 of bed support is provided to facilitate the gas flow to reach the upper part of nozzle 225.

Figure 5:
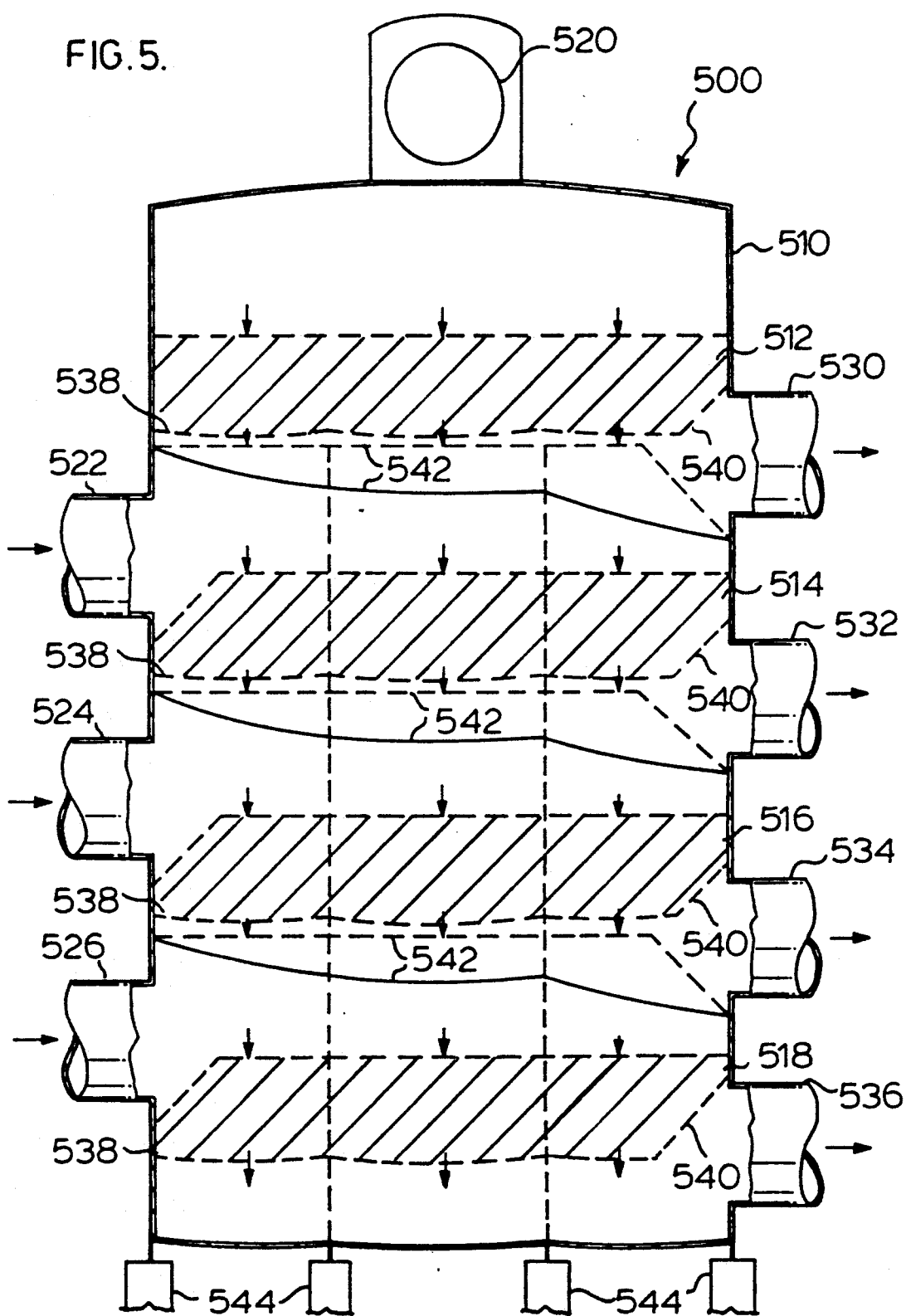
FIG. 5 is a schematic vertical sectional view of a converter according to the invention.

Shown generally as 500, in FIG. 5 is a converter standing on support posts 544 and having a plurality of catalyst beds 512, 514, 516 and 518, within shell 510, each having a full catalyst bed support 538 having a raised arcuate portion 540 adjacent gas exit ports 530, 532, 534 and 536, respectively.

Converter 500 has a top gas inlet port 520 and side gas entry ports 522, 524 and 526 in gaseous association with beds 512, 514, 516 and 518, respectively.

Disposed below each of beds 512, 514 and 516 is a full divider plate 542.

The sulphur dioxide catalytic converter shown in FIG. 5 having a shell 510 formed of ¼" thick stainless steel is typically 30 to 40 feet in diameter and advantageously 40 to 50 feet in height.

In operation, gaseous sulphur dioxide and/or sulphur dioxide-sulphur trioxide gaseous mixtures enter or leave ports 520, 522, 524, 526, 530, 532, 534, or 536 after passing through beds 512, 514, 516 and 518 and bed supports 538 in the gas flow sequence as selected and desired by the plant operator.

Figure 4:
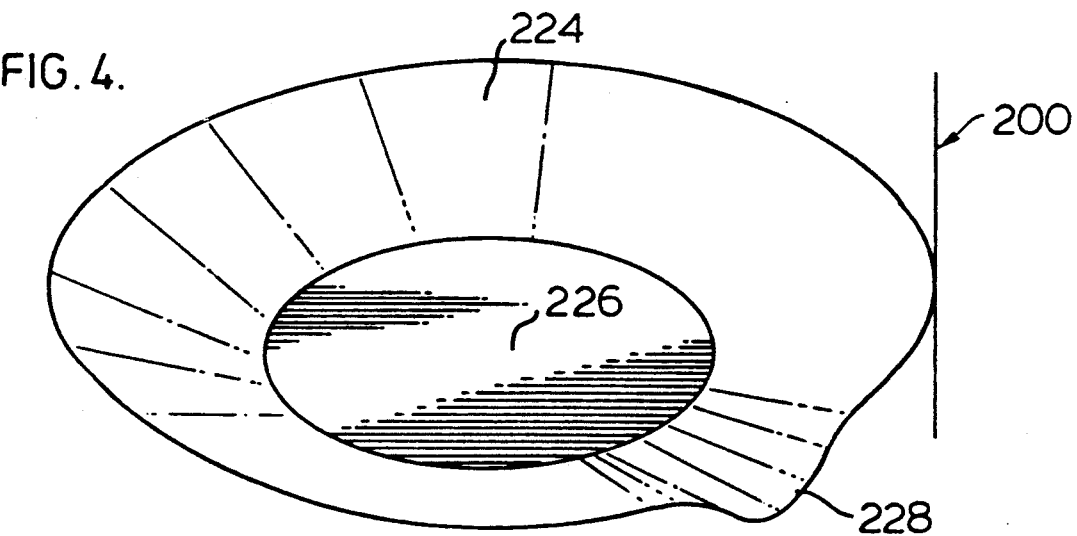
FIG. 4 is a diagramatic perspective view of a divider plate of use in a converter according to the invention.

The full divider plate shown in FIG. 4 is generally dished in having an inner plate 226, centrally and symmetrically disposed within converter shell (partly shown) and an annular curved plate 224 between plate 226 and shell 200.

Plate 224 has a lowered arcuate portion 228 adjacent the circumference of shell 200 adjacent the gas exit port of the catalyst bed above. The full divider plate prevents direct gaseous communication within shell 200 between the catalyst beds above the below the divider plate. The full divider plate shown in FIG. 4, is symmetrically of a saucer or fully dished shaped form apart from the presence of the lowered arcuate portion 228 adjacent the gas exit port above the divider plate.

None of the prior art converters as hereinabove described achieve the advantages of the converter described according to the invention.

Firstly, the classic approach has approximately equal volumes both above and below the catalyst beds and the transition pieces are very complex to get to round duct sections. U.S. Pat. No. 4,355,076, while providing exit nozzles which are inset into the gas divider below, provides no simple method of entering the space above a catalyst bed from a radial entry nozzle. In addition, the gas space above catalyst beds are very similar. In the present invention, the space above the catalyst bed is maximized and the space below the bed minimized for better gas distribution and also for ease of maintenance. Use of divider plates suitably shaped as shown provide significant advantages. In addition, only modest intrusions into the catalyst space are required to make significant savings in vessel height. Mechanical and process risks associated with the gas flow diverters are negligible.

It will be clear to those skilled in the art that the catalyst beds arrangement with its attendent divider plates taught can be used with any reasonable number of beds. It will also be clear that many support post and support ring or polygon arrangements for the support of rings 230 and posts 232.

Accordingly, improved converters utilizing the catalyst bed and associated structures as hereinabove defined now offers a method of bringing gas into the converter which uses a suitably shaped divider membrane between the catalyst beds and suitably shaped dividers intruding into the catalyst bed as a means of allowing round nozzles to be used even in very large plants. The modifications can be sealed by welding, can be designed to provide adequate access to catalyst for screening and can be used in any sized plant.

Although this disclosure has described and illustrated certain preferred embodiments of the invention, it is to be understood that the invention is not restricted to these particular embodiments. Rather, the invention includes all embodiments which are functional or mechanical equivalents of the specific embodiments and features that have been described and illustrated.

The embodiments of the invention in which an exclusive property or privilege is claimed are defined as follows:

1. In a catalytic having a shell, a plurality of horizontal catalyst bed supports upon which catalyst is retained and arranged, one bed support above another within said shell, and a plurality of horizontal divider plates, one located between each pair of bed supports; the improvement comprising:

at least one of said bed supports comprises a first full bed support extending essentially across the diameter of said shell, said full bed support comprising (i) an inner dished plate, centrally and symmetrically disposed within said shell, and (ii) an annular dished plate between said shell and said inner dished plate;

a substantially circular gas entry port and a substantially circular gas exit port within said shell in gaseous communication with said first full bed support;

and a substantially dished divider plate extending essentially across the diameter of said shell above said first bed support and comprising (i) an inner divider plate, centrally and symmetrically disposed within said shell and (ii) an annular curved divider plate radially between said shell and said inner divider plate having a raised first arcuate-shaped portion adjacent said shell substantially the circumference of said shell, said converter further comprising a second substantially circular gas exit port within said shell and not in gaseous communication with said first full bed support; and wherein said annular curved divider plate has a lowered second arcuate-shaped portion adjacent the circumference of said shell and said second gas exit port.

2. A converter as claimed in claim 1 further comprising an arcuate-shaped gas-deflector plate adjacent a lower portion of said gas entry port.

3. A converter as claimed in claim 2 wherein said annular dished plate has a raised arcuate-shaped portion adjacent an upper portion of said gas exit port.

4. A converter as claimed in claim 3 formed of stainless steel.

* * * * *